United States Patent
Kuo et al.

(10) Patent No.: US 7,657,669 B2
(45) Date of Patent: Feb. 2, 2010

(54) APPARATUS AND PROGRAM STORAGE DEVICE FOR MANAGING DATAFLOW THROUGH A PROCESSING SYSTEM

(75) Inventors: Lih-Chung Kuo, San Jose, CA (US); Andrew Moy, San Jose, CA (US); Carol Spanel, San Jose, CA (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 12/142,533

(22) Filed: Jun. 19, 2008

(65) Prior Publication Data

US 2008/0313368 A1    Dec. 18, 2008

Related U.S. Application Data

(63) Continuation of application No. 10/760,019, filed on Jan. 16, 2004, now Pat. No. 7,404,017.

(51) Int. Cl.
*G06F 3/00* (2006.01)
*G06F 5/00* (2006.01)

(52) U.S. Cl. .................. 710/35; 710/1; 710/29; 710/52; 710/57; 710/58; 710/60

(58) Field of Classification Search .............. 710/1, 710/29, 33, 34, 35, 52, 53, 57, 58, 60; 370/229, 370/230, 232, 235; 714/100, 1–3, 5, 48, 714/57

See application file for complete search history.

(56) References Cited

U.S. PATENT DOCUMENTS

| | | | | |
|---|---|---|---|---|
| 4,258,418 A * | 3/1981 | Heath | ........................... | 710/53 |
| 4,285,038 A * | 8/1981 | Suzuki et al. | ................. | 710/57 |
| 5,455,913 A * | 10/1995 | Shrock et al. | ............... | 710/100 |
| 5,778,175 A * | 7/1998 | Paul et al. | ................... | 709/250 |
| 5,948,081 A * | 9/1999 | Foster | .......................... | 710/40 |
| 6,101,568 A * | 8/2000 | Richardson | ................. | 710/310 |
| 6,496,890 B1 * | 12/2002 | Azevedo et al. | ............. | 710/110 |
| 6,628,613 B1 * | 9/2003 | Joung et al. | ................. | 370/230 |
| 6,646,985 B1 * | 11/2003 | Park et al. | ................... | 370/229 |
| 6,876,664 B1 * | 4/2005 | Bullis et al. | ................. | 370/429 |
| 6,975,593 B2 * | 12/2005 | Collier et al. | ............... | 370/236 |
| 2002/0065948 A1 * | 5/2002 | Morris et al. | ............... | 709/318 |
| 2003/0079059 A1 * | 4/2003 | Tsai | .............................. | 710/1 |
| 2004/0193757 A1 * | 9/2004 | Creta et al. | ................... | 710/33 |
| 2005/0138471 A1 * | 6/2005 | Okbay et al. | ................. | 714/25 |
| 2005/0259748 A1 * | 11/2005 | Payson et al. | ......... | 375/240.25 |
| 2005/0273528 A1 * | 12/2005 | Adams | ........................ | 710/57 |

* cited by examiner

*Primary Examiner*—Alford W Kindred
*Assistant Examiner*—Richard Franklin
(74) *Attorney, Agent, or Firm*—William K. Konrad; Konrad Raynes and Victor LLP

(57) ABSTRACT

A method, apparatus and program storage device for managing dataflow through a processing system is disclosed. A buffer monitor maintains and monitors a buffer full threshold to control the write throughput to a data bus.

18 Claims, 5 Drawing Sheets

APPARATUS AND PROGRAM STORAGE DEVICE FOR MANAGING DATAFLOW THROUGH A PROCESSING SYSTEM

RELATED APPLICATIONS

This application is a continuation application of copending application Ser. No. 10/760,019, filed Jan. 16, 2004, and is incorporated by reference in its entirety.

BACKGROUND OF THE INVENTION

1. Field of the Invention

This invention relates in general to computer buses, and more particularly to a method, apparatus and program storage device for managing dataflow through a processing system.

2. Description of Related Art

A conventional computer system typically includes one or more central processing units (CPUs) and one or more memory subsystems. Computer systems also include peripheral devices for inputting and outputting data. Some common peripheral devices include, for example, monitors, keyboards, printers, modems, hard disk drives, floppy disk drives, and network controllers.

One of the important factors in the performance of a computer system is the speed at which the CPU operates. Generally, the faster the CPU operates, the faster the computer system can complete a designated task. One method of increasing the speed of a computer is using multiple CPUs, commonly known as multiprocessing. However, the addition of a faster CPU or additional CPUs can result in different increases in performance among different computer systems. Although it is the CPU that executes the algorithms required for performing a designated task, in many cases it is the peripherals that are responsible for providing data to the CPU and storing or outputting the processed data from the CPU. When a CPU attempts to read or write to a peripheral, the CPU often "sets aside" the algorithm that is currently executing and diverts to executing the read/write transaction (also referred to as an input/output transaction or an I/O transaction) for the peripheral. As can be appreciated by those skilled in the art, the length of time that the CPU is diverted is typically dependent on the efficiency of the I/O transaction.

Although a faster CPU may accelerate the execution of an algorithm, a slow or inefficient I/O transaction process associated therewith can create a bottleneck in the overall performance of the computer system. As the CPU becomes faster, the amount of time executing algorithms becomes less of a limiting factor compared to the time expended in performing an I/O transaction. Accordingly, the improvement in the performance of the computer system that could theoretically result from the use of a faster CPU or the addition of additional CPUs may become substantially curtailed by the bottleneck created by the I/O transactions. Moreover, it can be readily appreciated that any performance degradation due to such I/O bottlenecks in a single computer system may have a stifling affect on the overall performance of a computer network in which the computer system is disposed.

As CPUs have increased in speed, the logic controlling I/O transactions has evolved to accommodate these transactions. Thus, most I/O transactions within a computer system are now largely controlled by application specific integrated circuits (ASIC). These ASICs contain specific logic to perform defined functions. For example, Peripheral Component Interconnect (PCI) logic is instilled within buses and bridges, which govern I/O transactions between peripheral devices and the CPU.

Peripheral component interconnect (PCI) provides for communicating between a host computer, systems memory and various devices or adapters, such as devices on the bus, plug-in cards, or integrated adapters. A PCI bus system typically interconnects a large number of electronic devices. The system must maintain, manage and communicate bidirectional data from one device to another device or several devices at once. Each device may output different voltage levels while maintaining capability to read data on the bus. One reason for the difficulty of continuously increasing bus speeds to match the continuously increasing processor speeds is that input/output buffers coupled to the busses must often operate across a wide variety of operating conditions. For instance, the performance of an input/output buffer changes with respect to conditions such as process, voltage and temperature.

Today, PCI logic has evolved into the Peripheral Component Interconnect Extended (PCI-X) to form the architectural backbone of the computer system. PCI-X logic has features that improve upon the efficiency of communication between peripheral devices and the CPU. PCI-X 2.0 is a new, higher speed version of the conventional PCI standard, which supports signaling speeds up to 533 megatransfers per second (MTS). Revision 1.0 of the PCI-X specification defined PCI-X 66 and PCI-X 133 devices that transferred data up to 133 MTS, or over 1 Gbyte per second for a 64-bit device. The PCI-X 2.0 revision adds two new speed grades: PCI-X 266 and PCI-X 533, offering up to 4.3 gigabytes per second of bandwidth, 32 times faster than the first generation of PCI.

PCI-X 2.0 is built upon the same architecture, protocols, signals, and connector as traditional PCI. The reuse of many of the design elements from the conventional PCI and PCI-X1.0b standards eases design and implementation migration. Migration to PCI-X 266 and PCI-X 533 is further simplified by retaining hardware and software compatibility with previous generations of PCI and PCI-X. As a result, new designs can immediately connect with hundreds of PCI and PCI-X products that are currently available. The combination of backwards compatibility and ease of migration provides investment protection for customers, developers, and manufacturers of existing PCI and PCI-X technologies as they migrate to PCI-X 266 and PCI-X 533.

PCI-X 2.0 also includes new features that will enhance applications in the future. It defines a new 16-bit interface width specifically designed for those applications that are constrained by space, such as embedded RAID controllers, or portable applications. PCI-X 2.0 also expands the device configuration space for each device-function to 4 Kbytes, and defines a new Device ID Message transaction to enable simplified peer-to-peer transactions for applications such as streaming-media.

PCI-X capable devices may include a scheduler to implement transaction ordering rules to determine which transaction in a queue will be handled next. To maximize data throughput on the PCI-X bus it has been found that write operations are best. Further, to maximize throughput with writes, small writes may be gathered together in a temporary buffer so that they can be burst on the PCIX bus as one large write. The speed and availability of the PCIX bus with respect to the CPU bus as well as the increase of stored data due to gathering may cause the buffer to fill. This may cause stalls at the processor (CPU) or cause data overwrites. To prevent the full buffer condition, a processor may gather writes in the buffer too slowly or not optimize the bursting of such writes.

It can be seen that there is a need for a method, apparatus and program storage device for managing dataflow through a processing system.

SUMMARY OF THE INVENTION

To overcome the limitations in the prior art described above, and to overcome other limitations that will become apparent upon reading and understanding the present specification, the present invention discloses a method, apparatus and program storage device for managing dataflow through a processing system.

The present invention solves the above-described problems by providing a buffer monitor that maintains and monitors a buffer full threshold to control the write throughput to a data bus.

A method in accordance with the principles of the present invention includes gathering writes in a buffer before transmitting a burst of writes over an external bus, monitoring the buffer to determine a number of writes in the buffer and whether the number of writes in the buffer exceed a predetermined threshold and providing control over writes provided to the buffer in response to the monitored number of writes in the buffer and the predetermined threshold.

In another embodiment of the present invention, a processing system is provided. The processing system includes a processor for generating writes over a processor bus, a buffer, coupled to the processor bus, for gathering the writes before transmitting a burst of writes over an external bus and a bus monitor, coupled to the write buffer, for determining a number of writes in the buffer and comparing the number of writes in the buffer to a predetermined threshold and providing a signal to the processor for causing the processor to slow writes to the buffer when the number of writes in the buffer exceed the predetermined threshold.

In another embodiment of the present invention, another processing system is provided. This processing system includes a memory for gathering writes for burst transmission over an external bus and a processor, coupled to the memory, the processor being configured for monitoring the memory to determine a number of writes in the buffer and whether the number of writes in the memory exceed a predetermined threshold and providing control over writes provided to the memory in response to the monitored number of writes in the buffer and the predetermined threshold.

In another embodiment of the present invention, a program storage device readable by a computer and tangibly embodying one or more programs of instructions executable by the computer to perform a method for managing dataflow through a processing system is provided. The method includes gathering writes in a buffer before transmitting a burst of writes over an external bus, monitoring the buffer to determine a number of writes in the buffer and whether the number of writes in the buffer exceed a predetermined threshold and providing control over writes provided to the buffer in response to the monitored number of writes in the buffer and the predetermined threshold.

In another embodiment of the present invention, another processing system is provided. This processing system includes means for gathering writes for burst transmission over an external bus and means, coupled to the means for gathering, for monitoring the means for gather to determine a number of writes in the buffer and whether the number of writes in the means for gather exceed a predetermined threshold and for providing control over writes provided to the means for gathering in response to the monitored number of writes in the buffer and the predetermined threshold.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for managing dataflow through a processing system. The present invention provides a buffer monitor that maintains and monitors a buffer full threshold to control the write throughput to a data bus.

Figure 1:
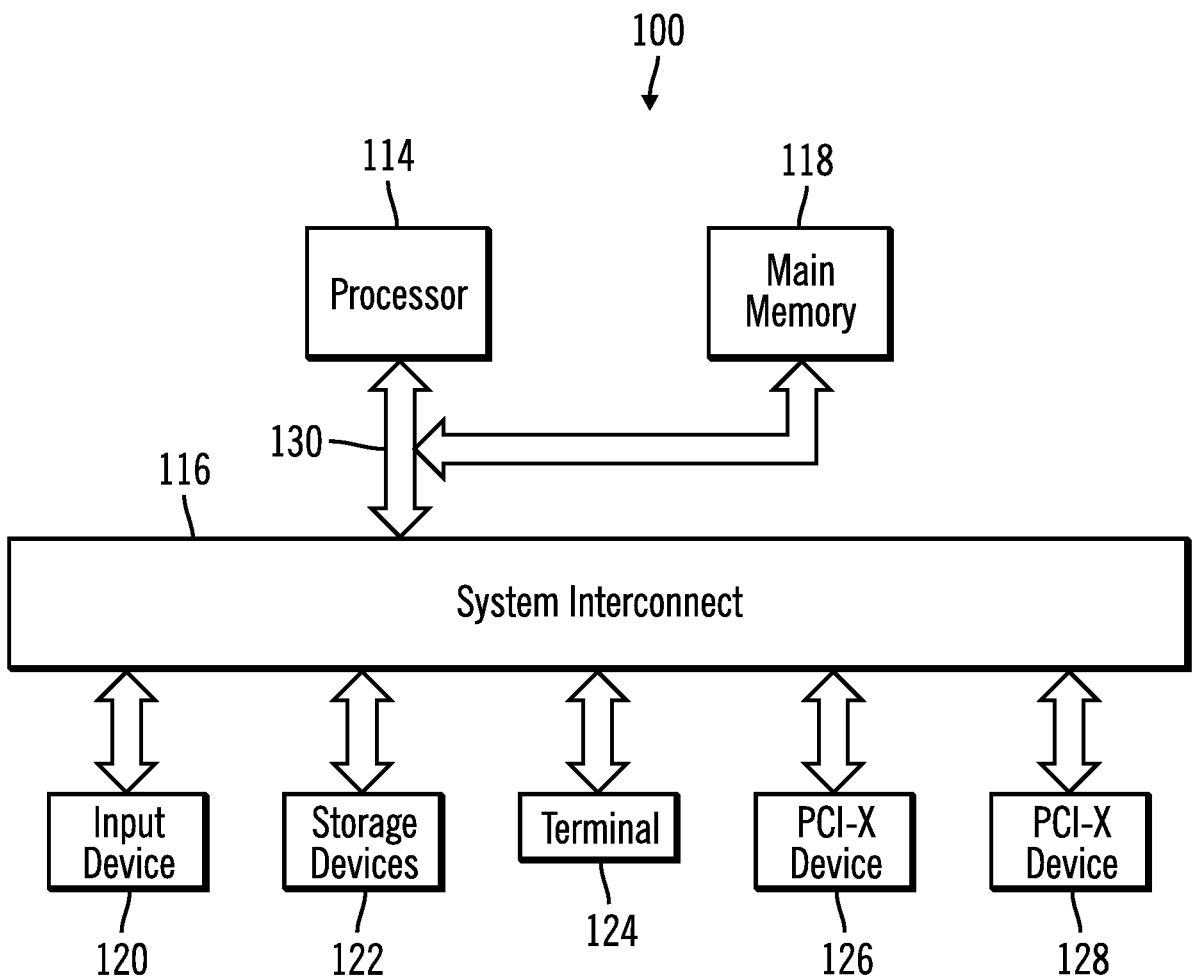
FIG. 1 illustrates a computer system according to an embodiment of the present invention.

FIG. 1 illustrates a computer system 100 according to an embodiment of the present invention. In FIG. 1, the computer system 100 includes a system interconnect 116. The computer system 100 also includes, illustratively, at least a processor 114, a main memory 118, an input device 120, a storage device 122, a terminal 124, and PCI-X devices 126 and 128 (collectively, PCI-X devices 120-128); all coupled to the system interconnect 116. The processor 114 and the main memory 118 are coupled to the system interconnect 116 via a bus 130.

The PCI-X devices 126 and 128 may be any devices that transfer data and control signals with other devices via the system interconnect 116 according to the PCI-X specification. Terminal 124 is any display device such as a cathode ray tube (CRT) or a plasma screen. Terminal 124 may also be desktop or PC-based computers, workstations, network terminals, or other networked computer systems. Input device 120 can be any device to give input to the computer system 100. For example, a keyboard, keypad, light pen, touch screen, button, mouse, track ball, or speech recognition unit could be used. Further, although shown separately, the terminal 124 and the input device 120 could be combined. For example, a display screen with an integrated touch screen, a display with an integrated keyboard or a speech recognition unit combined with a text speech converter could be used.

Storage devices 122 may be DASD (Direct Access Storage Device), although it could be any other storage such as floppy disc drives or optical storage. Although storage devices 122 are shown as a single unit, it could be any combination of fixed and/or removable storage devices, such as fixed disc drives, floppy disc drives, tape drives, removable memory cards, or optical storage. Main memory 118 and storage devices 122 could be part of one virtual address space spanning multiple primary and secondary storage devices.

The contents of main memory 118 can be loaded from and stored to the storage devices 122 as the processor 114 has a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed to low speed memory devices.

Figure 2:
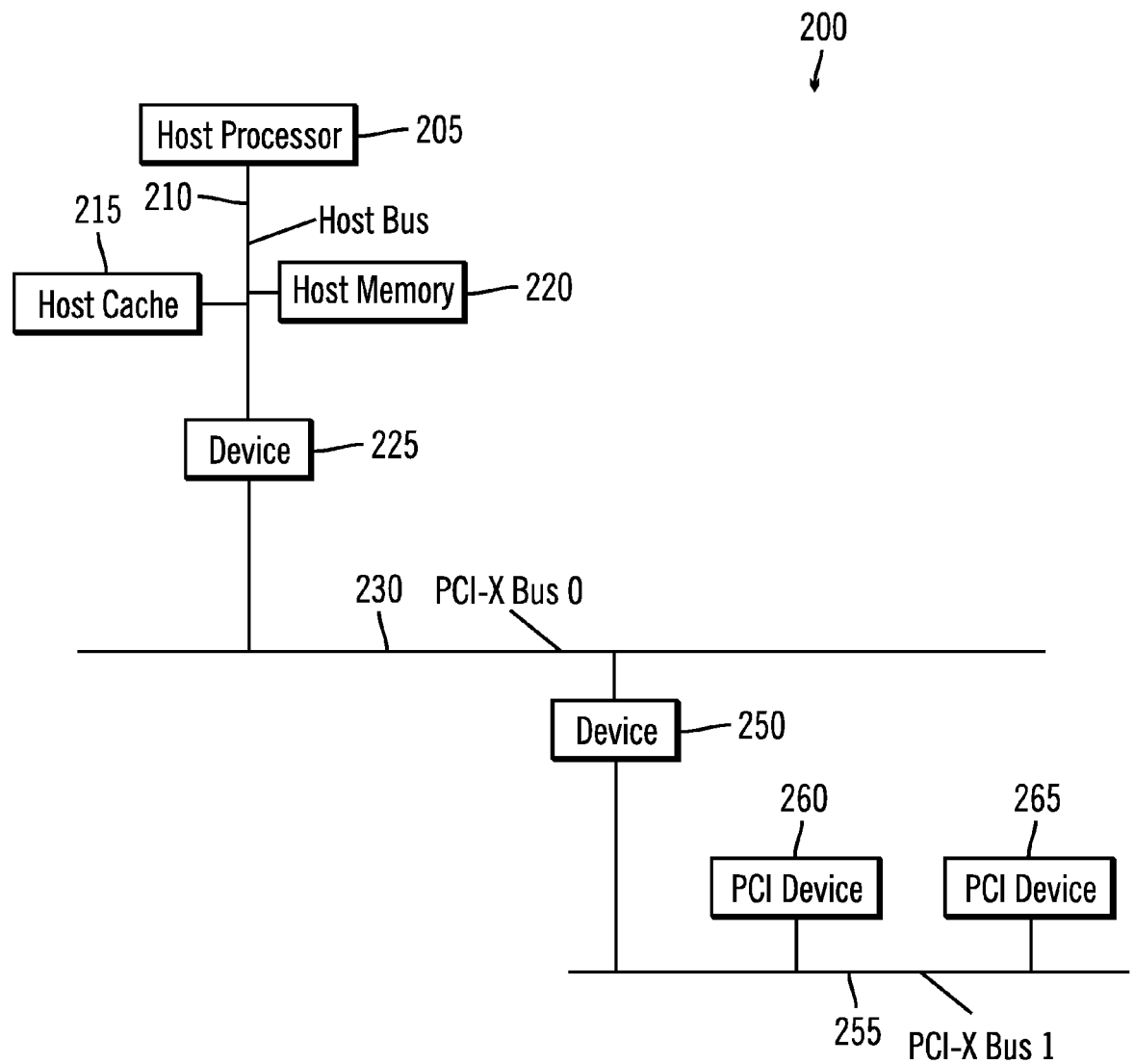
FIG. 2 illustrates one example of a system employing a PCI-X bus according to an embodiment of the present invention.

FIG. 2 illustrates one example of a system 200 employing a PCI-X bus according to an embodiment of the present invention. System 200 accommodates PCI-X bus interconnection of host processor 205 and PCI-X devices 260 and 265. Host processor 205 utilizes host cache 215 and host memory 220 for memory operations via host bus 210. Devices 225 and 250 implement the bridges, memory controllers, interrupt controllers, bus arbiters, etc. for proper PCI-X bus communication management. PCI-X devices 260 and 265 may consist of a complete peripheral adapter encapsulated within an IC package or integrated onto a PCI-X compliant PCB. Typical examples of PCI-X devices 260 and 265 include networking adapters, display adapters or Small Computer Systems Interface (SCSI) adapters, to name only a few. Each of PCI-X devices 260 and 265 may act as bus masters, in which they each may initiate PCI-X transactions when acting as bus masters. An arbiter contained within device 250 arbitrates access between PCI-X bus 1 255 and PCI-X bus 0 230, so that PCI-X devices 260 and 265, acting as bus masters, do not conflict with each other.

Figure 3:
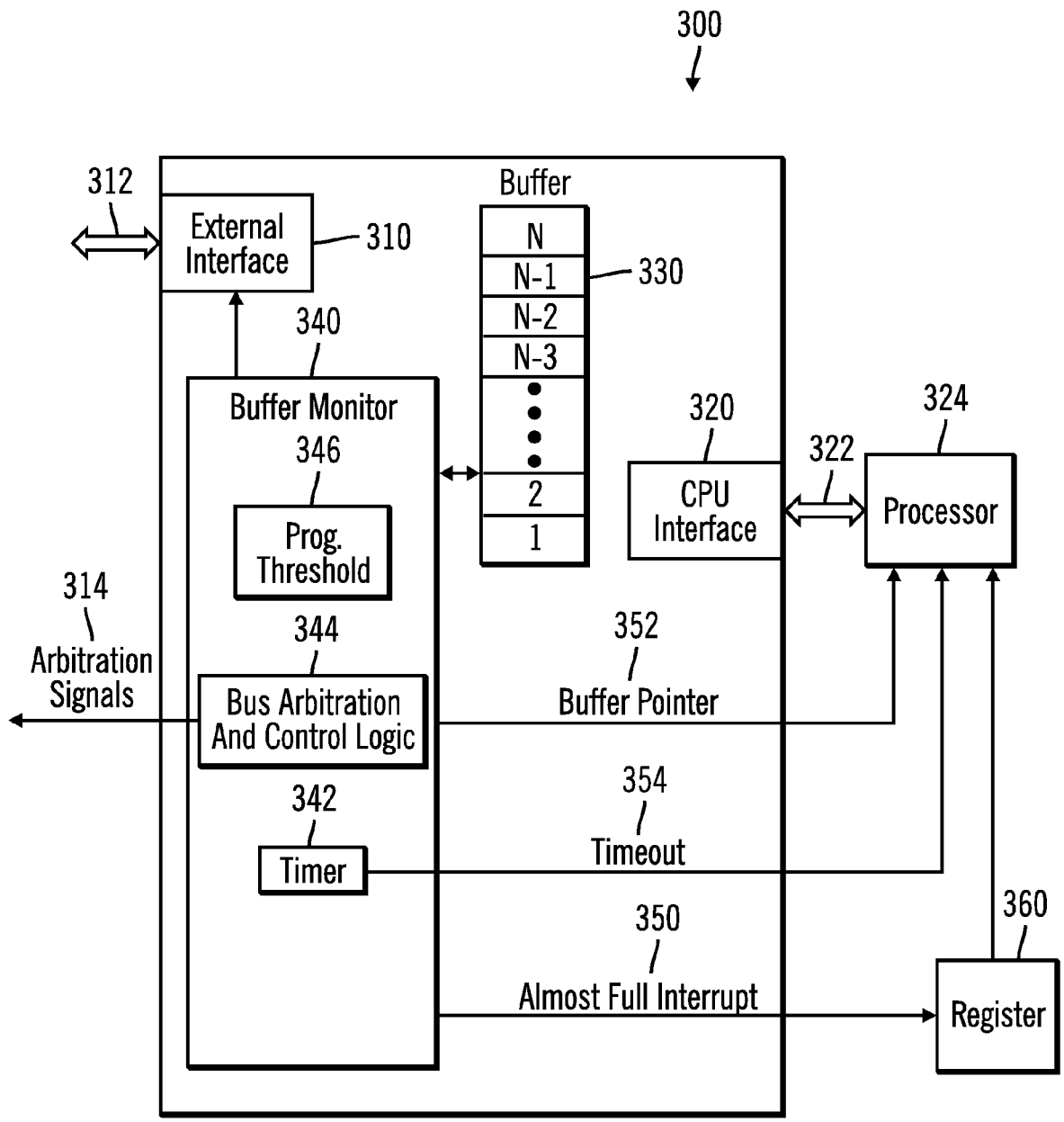
FIG. 3 illustrates an example of a PCI-X device for providing buffer monitoring and management according to an embodiment of the present invention.

FIG. 3 illustrates an example of a PCI-X device 300 for providing buffer monitoring and management according to an embodiment of the present invention. The PCI-X bus device 300 includes a PCI-X bus external interface 310 to PCI-X bus 312, and a CPU interface 320 to host bus 322 and CPU 324. The PCI-X bus device 300 provides access channels to a buffer 330, e.g., a FIFO buffer, for gathering writes for bursting over external interface 310. The PCI-X bus device 300 also includes a buffer monitor 340 for communicating with the CPU 324 to provide control and management of the buffer 330. The buffer monitor 340 manages message and dataflow through the processing system to keep the processor 324 from stalling or losing data. The buffer monitor 340 also enables an error recovery without performing a full restart.

Systems in which many devices share a common resource typically utilize arrangements for allocating access to the resource under conditions during which a plurality of associated devices may concurrently request access. Buffer monitor 340 provides an arbitration signal 314 for controlling the competition for the ownership of bus 312

To maximize throughput with writes, small writes are gathered together in buffer 330. The buffer monitor then bursts the writes out as one large write. The buffer monitor 340 includes timers 342 and bus arbitration and control logic 344 to move data. The buffer monitor 340 monitors the buffer 330 and buses 312, 322 for error conditions or pending error conditions to prevent the processor 324 from stalling, i.e., from being blocked from continued operation on other threads. The buffer monitor 340 also includes a programmable threshold 346 that monitors the almost full state of the buffer. When this threshold 346 is exceeded, the buffer monitor 340 asserts the processor interrupt line 350 and writes a vector indicating almost full condition to a register 360. The processor 324 reads the register 360 and then slows the writes to the PCI-X bus 312 to allow the buffer 330 to clear. The processor 324 monitors the state of the buffer 330 to determine if there is a problem, e.g., determines if the movement of data is just slow or if it is stalled. If the movement of data is stalled, the processor 324 takes action to correct the problem or notifies other agents (not shown) of the problem. The buffer monitor 340 provides a buffer pointer 352 to the processor 324 to control the movement of writes from the processor 324 to the buffer 330.

The buffer monitor 340 also clears the CPU bus (if stalled) so that the processor 324 can read the register 360, cleans up the buffer 330 in the PCI-X bus device 300 and performs error recovery on the PCI-X device 300. The buffer monitor 340 monitors the processor 324 bus to make sure that it does not become stalled again if the processor 324 should write something to the full buffer 330. This is done with a timer 342 that is reset every time a transaction on the processor bus 322 is cleared. A timeout signal 354 is conveyed to the processor 324. The processor 324 performs error recovery by resetting the buffers and any activities in its control that caused the stalled or overload conditions.

Figure 4:
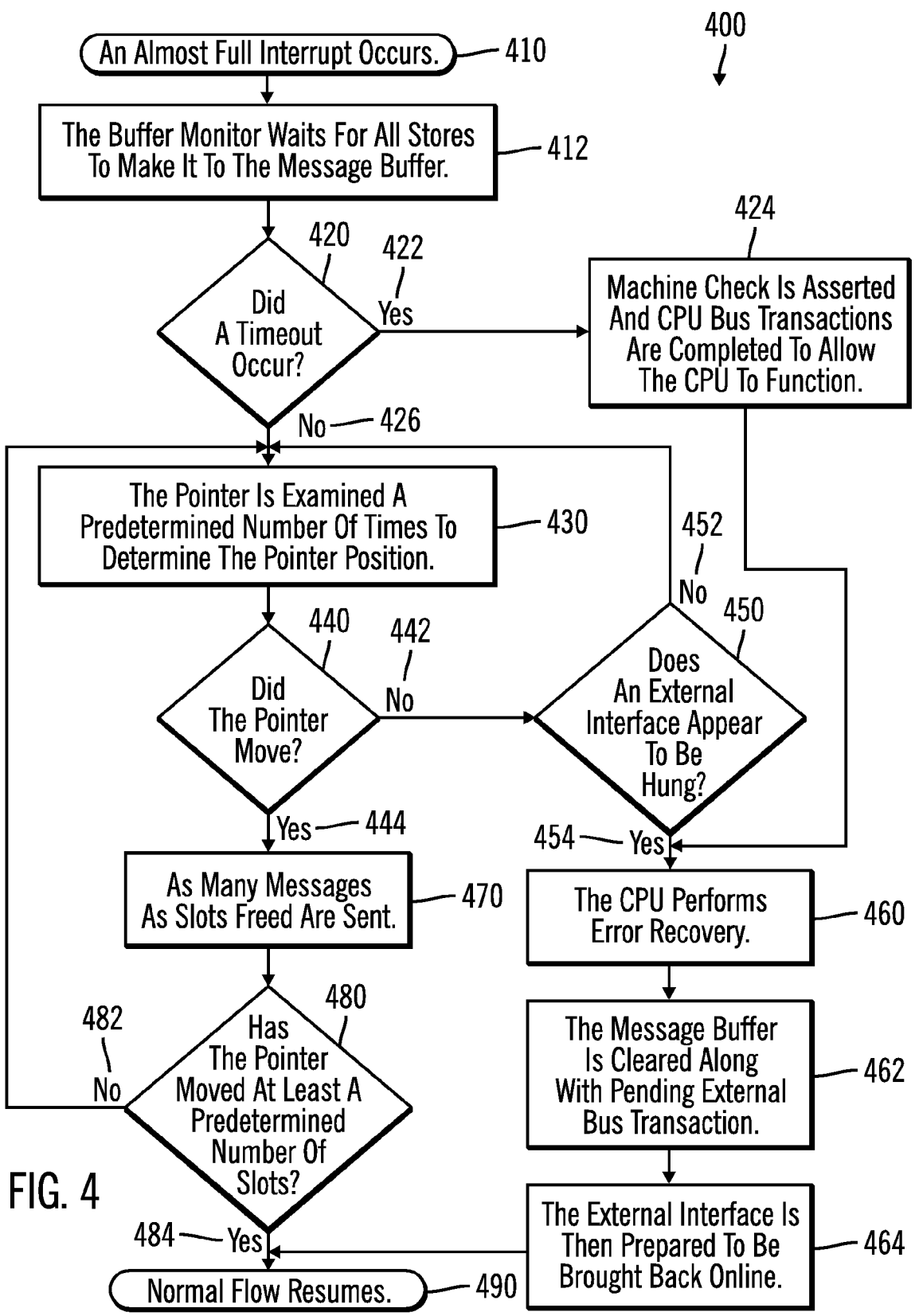
FIG. 4 is a flow chart of the method for managing dataflow through a processing system according to an embodiment of the present invention.

FIG. 4 is a flow chart 400 of the method for managing dataflow through a processing system according to an embodiment of the present invention. In FIG. 4, an almost full interrupt occurs 410. The buffer monitor waits for all stores to make it to the message buffer 412. A determination is made whether a timeout occurred 420. If a timeout occurs 422, machine check is asserted and CPU bus transactions are completed to allow the CPU to function 424. If a timeout did not occur 426, the pointer is examined a predetermined number of times to determine the pointer position 430. A determination is made whether the pointer moved 440. If the pointer has not moved 442, a determination is made whether an external interface appears to be hung 450. If an external interface is not hung 452, the process again examines the pointer position 430. If an external interface is hung 454, or after machine check is asserted and CPU bus transactions are completed 424, the CPU performs error recovery 460. The message buffer is cleared along with pending external bus transaction 462. The external interface is then prepared to be brought back online 464 and normal flow resumes 490.

If the pointer has moved 444, as many messages as slots freed are sent 470. A determination is made whether the pointer has moved at least a predetermined number of slots 480. If the pointer has not moved a predetermined number of slots 482, the process returns to again examine the pointer position 430. If the pointer has moved a predetermined number of slots 484, normal flow resumes 490.

Figure 5:
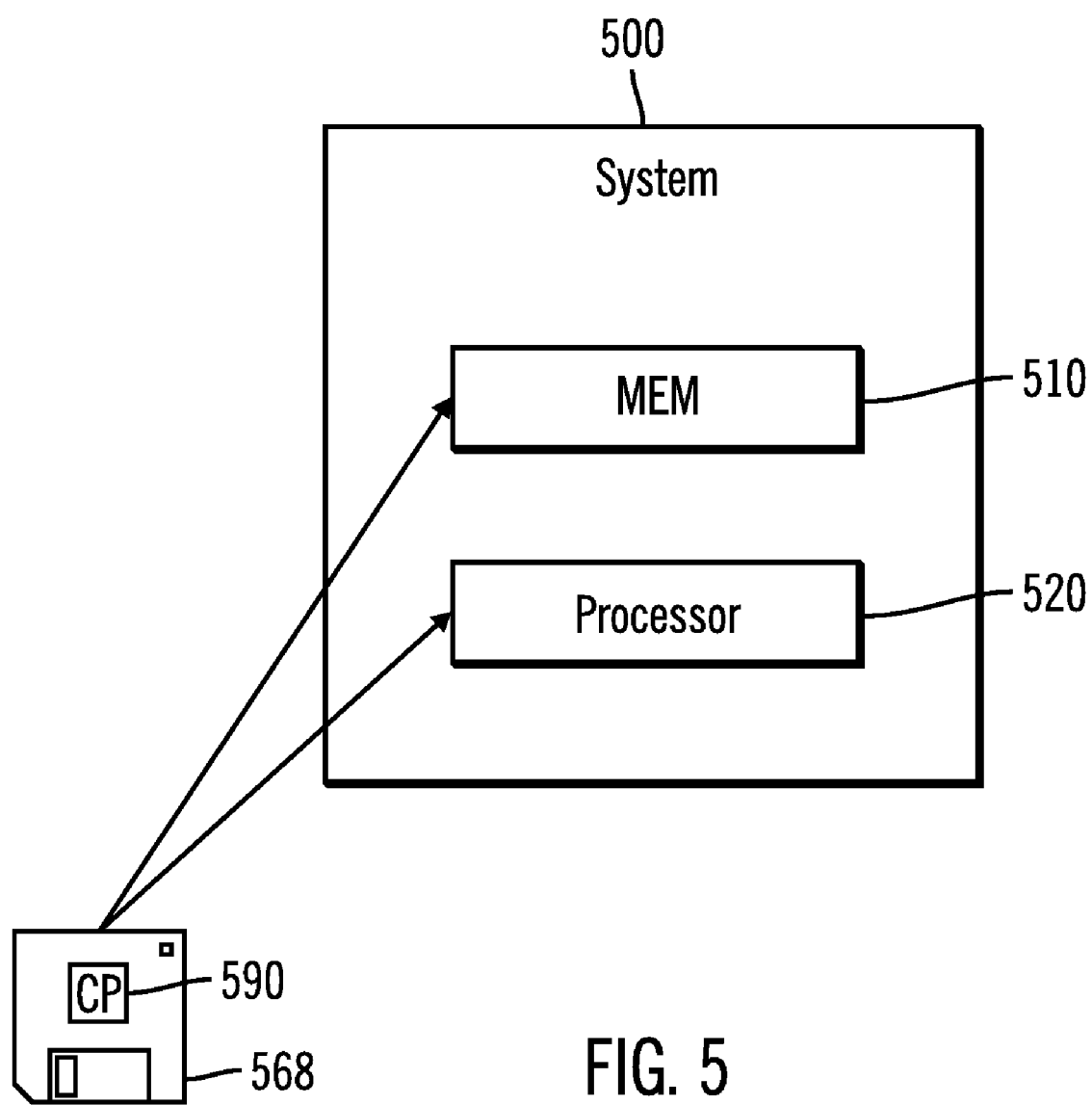
FIG. 5 illustrates a PCI-X device according to an embodiment of the present invention.

FIG. 5 illustrates a PCI-X device 500 according to an embodiment of the present invention, wherein the process illustrated with reference to FIGS. 3-4 may be tangibly embodied in a computer-readable medium or carrier, e.g. one or more of the fixed and/or removable data storage devices 568 illustrated in FIG. 5, or other data storage or data communications devices. The PCI-X device includes memory 510 and a processor 520. A computer program 590 expressing the processes embodied on the removable data storage devices 568 may be loaded into the memory 510 or into the processor 520 to configure the PCI-X device 500 of FIG. 5, for execution. The computer program 590 comprise instructions which, when read and executed by the controller 500 of FIG. 5, causes the controller system 500 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A processing system, comprising:
   a processor for generating writes over a processor bus; a buffer, coupled to the processor bus, for gathering the writes before transmitting a burst of writes over an external bus; and
   a bus monitor, coupled to the write buffer, for determining a number of writes in the buffer, identifying an error condition when the number of writes in the buffer exceed a predetermined threshold, and providing control over a rate of a number of writes provided to the buffer in response to the monitored number of writes in the buffer and the predetermined threshold; and
   a register, the buffer monitor providing a vector to the register, the processor scanning the register for the vector to determine when the number of writes in the buffer is static and to slow writes to the buffer in response thereto.

2. The processing system of claim 1 further comprising an external interface coupled to the buffer, the external interface linking the buffer to the external bus.

3. The processing system of claim 1, wherein the external bus comprises a PCI-X bus.

4. The processing system of claim 1 further comprising a processor interface coupled to the buffer, the processor interface linking the buffer to a processor bus.

5. The processing system of claim 1, wherein the processor initiates error recovery in response to the writes in the buffer exceeding the predetermined threshold.

6. The processing system of claim 1, wherein the buffer monitor provides an arbitration signal for controlling access to an external bus in response to the comparison of the writes in the buffer to the predetermined threshold.

7. The processing system of claim 1, wherein the buffer monitor comprises bus arbitration and control logic for controlling the movement of data onto the external bus.

8. The processing system of claim 7, wherein the buffer bursts the writes onto the external bus.

9. The processing system of claim 1 wherein the buffer monitor provides the vector by asserting an interrupt line to the register to provide an indication of an almost full state for the buffer.

10. The processing system of claim 1, wherein the vector represents an almost full state for the buffer.

11. The processing system of claim 1, wherein the buffer monitor monitors the buffer, the external bus, and the processor bus for error conditions.

12. The processing system of claim 11, wherein the error conditions comprise anticipated error conditions based upon detecting a static buffer pointer representing a lack of movement of writes in the buffer.

13. The processing system of claim 1, wherein the buffer monitor provides a buffer pointer to the processor to control the movement of writes from the processor to the buffer.

14. The processing system of claim 1, wherein the processor clears the buffer when the writes in the buffer exceed the predetermined threshold.

15. The processing system of claim 1, wherein the buffer monitor comprises a timer for providing a timeout signal to the processor when a transaction on the processor bus is not cleared within a predetermined amount of time.

16. A processing system, comprising:
   a memory for gathering writes for burst transmission over an external bus;
   a processor, coupled to the memory, the processor being configured for monitoring the memory to determine a number of writes in the memory and whether the number of writes in the memory exceed a predetermined threshold, identifying an error condition when the number of writes in the memory exceed the predetermined threshold, and providing control over a rate of a number of writes provided to the memory in response to the monitored number of writes in the memory and the predetermined threshold; and
   a register, wherein a vector is provided to the register, the processor scanning the register for the vector to determine when the number of writes in the memory is static and to slow writes to the memory in response thereto.

17. A program storage device readable by a computer, the program storage device tangibly embodying one or more programs of instructions executable by the computer to perform a method for managing dataflow through a processing system, the method comprising:
   gathering writes in a buffer before transmitting a burst of writes over an external bus;
   monitoring the buffer to determine a number of writes in the buffer and whether the number of writes in the buffer exceed a predetermined threshold;
   identifying an error condition when the number of writes in the buffer exceed the predetermined threshold; and
   providing control over a rate of a number of writes provided to the buffer in response to the monitored number of writes in the buffer and the predetermined threshold;
   wherein the providing control over a rate of a number of writes provided to the buffer further comprises providing a vector to a register and scanning the register for the vector to determine when the number of writes in the buffer is static and to slow writes to the buffer in response thereto.

18. A processing system, comprising:
   means for gathering writes for burst transmission over an external bus; and
   means, coupled to the means for gathering, for monitoring the means for gathering to determine a number of writes in the means for gathering and whether the number of writes in the means for gathering exceed a predetermined threshold, for identifying an error condition when the number of writes in the means for gathering exceed the predetermined threshold, and for providing control over a rate of a number of writes provided to the means for gathering in response to the monitored number of writes in the means for gathering and the predetermined threshold; and
   a register, wherein a vector is provided to the register, the means for monitoring scanning the register for the vector to determine when a number of writes in the means for gathering is static and to slow writes to the means for gathering in response thereto.

\* \* \* \* \*